United States Patent
Myrdek et al.

(10) Patent No.: US 12,552,740 B2
(45) Date of Patent: Feb. 17, 2026

(54) AMIDATED FATTY ACIDS AND DERIVATIVES THEREOF

(71) Applicant: KAO CHEMICALS GMBH, Emmerich (DE)

(72) Inventors: Thomas Myrdek, Emmerich (DE); Jürgen Benade, Emmerich (DE)

(73) Assignee: KAO CHEMICALS GMBH, Emmerich (DE)

( * ) Notice: Subject to any disclaimer, the term of this patent is extended or adjusted under 35 U.S.C. 154(b) by 496 days.

(21) Appl. No.: 18/157,987

(22) Filed: Jan. 23, 2023

(65) Prior Publication Data

US 2023/0234915 A1   Jul. 27, 2023

(51) Int. Cl.
  *C07C 231/22* (2006.01)
  *C07C 231/14* (2006.01)
  *C07C 231/24* (2006.01)

(52) U.S. Cl.
  CPC .......... *C07C 231/22* (2013.01); *C07C 231/14* (2013.01); *C07C 231/24* (2013.01)

(58) Field of Classification Search
  CPC ... C07C 231/22; C07C 231/14; C07C 231/24; C07C 231/02
  See application file for complete search history.

(56) References Cited

U.S. PATENT DOCUMENTS

| | | | |
|---|---|---|---|
| 3,992,443 A | 11/1976 | Springmann | |
| 4,625,057 A | 11/1986 | Springmann | |
| 6,034,257 A * | 3/2000 | Oftring | C11D 1/526 554/68 |
| 7,179,452 B2 | 2/2007 | Muller et al. | |
| 9,909,081 B2 * | 3/2018 | Scanlon | C10M 133/16 |
| 2005/0197261 A1 | 9/2005 | Leinweber | |
| 2006/0047141 A1 * | 3/2006 | Behler | C07C 231/12 560/345 |
| 2009/0023623 A1 | 1/2009 | Yamamoto et al. | |
| 2011/0034359 A1 | 2/2011 | Rabbat | |
| 2011/0154724 A1 * | 6/2011 | Martyak | C11B 5/005 44/388 |
| 2014/0315769 A1 | 10/2014 | Rabbat | |
| 2015/0011455 A1 | 1/2015 | Moragas Arjant et al. | |
| 2017/0009172 A1 | 1/2017 | Bender | |

FOREIGN PATENT DOCUMENTS

| | | | | |
|---|---|---|---|---|
| CS | 256198 B1 * | 4/1988 | | |
| EP | 1329214 | 7/2003 | | |
| EP | 1479754 | 11/2004 | | |
| EP | 11739161 | 1/2007 | | |
| EP | 2612652 | 7/2013 | | |
| JP | H03-103500 | 4/1991 | | |
| WO | WO-02081381 A1 * | 10/2002 | | B01D 3/38 |
| WO | 2009040370 | 4/2009 | | |
| WO | 2016093291 | 6/2016 | | |

OTHER PUBLICATIONS

Armarego, W. L. and Chai C. (2013), Common Physical Techniques Used in Purification. In Purification of Laboratory Chemicals (Seventh Edition), Eds. W. L.F. Armarego and C. Chai, Butterworth-Heinemann, 1-70. (Year: 2013).*
CS 256198 B1 English machine translation obtained from STIC translation services, USPTO, Alexandria, VA on Sep. 25, 2025. (Year: 2025).*
WO 2002081381A1 English machine translation retrieved from Espacent on Sep. 25, 2025. (Year: 2025).*
Notice of Reasons for Rejection in Japanese Patent Application Serial No. 2020-556901, dated Feb. 13, 2023 (English translation attached).
Shigabieva, "Colloidal and chemical properties of foaming and gel compositions with biologically active components", Thesis, Kazan, 2014, Chapter 1.3.
Great Medical Encyclopedia, edited by B.V. Petrovskiy, 3rd edition, 1989, online version.
Office Action in co-pending U.S. Appl. No. 17/047,751, dated Jan. 31, 2023.

* cited by examiner

*Primary Examiner* — Amanda L. Aguirre
(74) *Attorney, Agent, or Firm* — Hovey Williams LLP; Crissa A. Cook

(57) ABSTRACT

The present invention relates to a process for obtaining amidated fatty acids or derivatives thereof good in color even after longer storage with low concentrations of undesired by-products. The present invention also relates to use of amidated fatty acids or derivatives thereof obtained by the process in the cosmetic applications. Further, the present invention also relates to use of amidated fatty acids or derivatives thereof obtained by the process in the industrial applications.

20 Claims, No Drawings

AMIDATED FATTY ACIDS AND DERIVATIVES THEREOF

CROSS-REFERENCE TO RELATED APPLICATIONS

The present application claims the priority benefit of European Patent Application Serial No. EP 22 152 937.3, filed Jan. 24, 2022, entitled AMIDATED FATTY ACIDS AND DERIVATIVES THEREOF, incorporated by reference in its entirety herein.

FIELD OF THE INVENTION

The present invention relates to a process to obtain an amidated fatty acid or derivatives thereof having low contents of undesired by-products, low in color and with stable color with pass of time; amidated fatty acids or derivatives thereof obtained by the process; and use thereof in cosmetic and industrial applications.

STATE OF ART

Amidated fatty acids and derivatives thereof can be prepared, in a manner known per se, by reacting triglycerides with alkanolamine (aminolysis) obtaining a mixture of fatty acid alkanolamides. Then, the mixture of fatty acid alkanolamides is alkoxylated. Generally the reaction of alkanolamide with ethylene or propylene or butylene oxide (alkoxylation) is carried out in the presence of alkaline catalyst such as NaOH, KOH, $NaOCH_3$ and $KOCH_3$ for example. However, the disadvantages are that during alkoxylation undesired by-products such as dioxane and aldehydes among others can be formed. Therefore, reaction products can become darker during storage and eventually have high contents of undesired products. Both factors limit the use of the products.

Factors affecting the color stability of the product include aldehydes present in trace amounts in the alkanolamine. Although reduction of aldehyde concentration is known to be improved by steam distillation or the like at the end of the reaction, there is still a need to improve the process to obtain better color stability.

The presence of undesired by-products, such as dioxane affects to the quality of the product and the product fulfillment according to present legislation requirements.

EP1572624 describes the production of light colored polyalkylene glycol diethyl ether of fatty acid alkanolamine by adding ethylene oxide on fatty acid alkanolamine in the presence of alkaline catalysts. The method requires performing an alkoxylation reaction in the presence of reducing agents, and treating the obtained products by water vapor in alkaline media. The method claimed therein is concerned with improving the color of the alkoxylated fatty alkanolamides products immediately as obtained by the described procedure, and only to a certain extent.

U.S. Pat. No. 4,897,492 describes a method for preparing low color fatty amides by reacting a fatty acid amides with an amine in the presence of hypophosphorous acid and a hindered phenol compound. The reaction also needs to take place in the substantial absence of oxygen. The resulting fatty acid amides are relatively low in color and relatively color stable during storage.

However, there is still need to achieve an even greater extent of reducing the undesirable dark color, in particular after longer storage, while keeping the content of undesired by-products low. For applications where direct contact to humans is conducted, low by-product values are requested. In applications, like, e.g., cosmetics, leave on or rinse off products, there is a great demand for special low by-product additives. But also in industrial applications, like metal working fluids, a low amount of by-products is desired, because even there, contact of the product to the human skin can occur. Therefore, a low amount of harmful by-products is needed.

Accordingly, there is remaining demand for better processes to obtain amidated fatty acids which avoid the disadvantages mentioned above. Thus, it is an object of the present invention to provide a process for obtaining amidated fatty acids or derivatives thereof low in color even after longer storage and with low contents of undesired by-products, particularly dioxane.

SUMMARY OF THE INVENTION

The inventors have surprisingly found a new process for the production of amidated fatty acids or derivatives thereof wherein color and undesired by-product concentration are improved. More specifically, the process of the invention allows the production of amidated fatty acid or derivatives thereof with low by-product concentrations and stable low color values, even after longer storage at higher temperatures, and even when stored under air atmosphere.

The process for production of amidated fatty acids is connected to obtain a product low in color even after longer storage (avoiding darkening of product), and is also connected to the reduction of undesired by-product obtained during the process.

The use of one or more catalysts in the process can provide optimal reaction medium conditions to avoid undesired by-products formation during alkoxylation. Additionally, by applying the process of the present invention, it is possible to achieve low concentration of undesired by-products even without using reducing agents during alkoxylation.

The present inventors have discovered that the use of additives in two separate additions during the preparation of mixture of amidated fatty acids or derivatives thereof substantially decreases discoloration or browning over storage time.

Thus, the first object of the present invention is the process to obtain amidated fatty acids or derivatives thereof with low concentration of undesired by-products obtained during the process.

Second object of the present invention is the process to obtain amidated fatty acids or derivatives thereof low in color with less discoloration even after longer storage.

Another object of is the use of said amidated fatty acids or derivatives thereof in cosmetics.

A further object is the use of the present invention in industrial applications.

DETAILED DESCRIPTION OF THE INVENTION

The main object of the present invention is a process for preparing amidated fatty acids or derivates thereof represented by general formula (I) and its use in cosmetics and industrial applications.

According to the present invention, amidated fatty acids or derivatives thereof obtained by the process of the invention are represented by formula (I):

$$R^1\text{—C(O)—NH—(P)—H} \qquad \text{(I)}$$

wherein $R^1$ is a linear or branched alkyl chain containing 4 to 26, preferably from 8 to 22, more preferably from 12 to 18 carbon atoms, or a linear alkenyl chain containing 4 to 26, preferably from 8 to 22, more preferably from 12 to 18 carbon atoms and from 1 to 3 double bonds; P comprises, preferably consists of, an average of n units of —$(CH_2CH_2O)$—, and/or an average of m units of —$(CH_2CHR^2O)$— or —$(CHR^2CH_2O)$—, and/or an average of q units of —$(CH_2CHR^3O)$— or —$(CHR^3CH_2O)$—, wherein $R^2$ represents a —$CH_3$ group, $R^3$ represents a —$CH_2CH_3$ group, n represents a number within the range of 0 to 20, m represents a number within the range of 0 to 20, q represents a number within the range of 0 to 20, and the sum of n+m+q represents the average alkoxylation degree which corresponds to a number from 1 to 40.

In one embodiment of the present invention, the amidated fatty acids or derivatives thereof represented by formula (I) comprises a mixture of compounds according to formula (I). For example, as will be appreciated by the person skilled in the art, when in Formula (II) in the process of the invention at least one of the groups $R^4$, $R^5$ and $R^6$ is different from the others, the resulting compound of Formula (I) is a mixture of fatty acids or derivatives thereof with different groups falling within the definition of $R^1$. In one embodiment of the present invention, $R^1$ is a linear or branched alkyl chain containing 4 to 26 carbon or a linear alkenyl chain containing 4 to 26 carbon atoms and from 1 to 3 double bonds; preferably the alkyl or alkenyl chain contains 8 to 22 carbon atoms, more preferably 12 to 18 carbon atoms.

In another embodiment of the present invention, $R^1$ is a linear or branched alkyl or a linear alkenyl derived from natural fats and oils, as well as of synthetic origin. Preferred fats and oils include palm oil, coconut oil, sunflower oil, rapeseed oil, castor oil, olive oil, soybean oil; animal fat such as tallow, bone oil, fish oil, hardened oils and semi-hardened oils thereof, and mixtures thereof. As a result of its natural origin, the fats and oils may contain a great variety of alkyl and/or alkenyl groups, said groups being linear or branched, saturated or unsaturated.

As used herein, the term "alkyl" refers to a straight or branched hydrocarbon chain containing from 4 to 26 carbon atoms.

As used herein, the term "alkenyl" refers to a linear hydrocarbon chain containing from 4 to 26 carbon atoms and from 1 to 3 double bonds.

In a preferred embodiment of the invention, $R^1$ is a linear or branched alkyl containing 4 to 26 carbon atoms or a linear alkenyl containing 4 to 26 carbon atoms and from 1 to 3 double bonds; preferably, the alkyl or alkenyl contains 8 to 22 carbon atoms, more preferably 12 to 18 carbon atoms, derived from natural oils.

In another preferred embodiment of the present invention, fats and oils include palm oil, coconut oil, sunflower oil, rapeseed oil, castor oil, olive oil, soybean oil; animal fat such as tallow, bone oil, fish oil, hardened oils and semi-hardened oils thereof, and mixtures thereof.

In a particular preferred embodiment, $R^1$ is a linear or branched alkyl chain containing 8 to 22 carbon or a linear alkenyl chain containing 8 to 22 carbon atoms and from 1 to 3 double bonds, derived from rapeseed oil.

In one embodiment of the present invention, the mixture of amidated fatty acids or derivatives thereof represented by formula (I) can be ethoxylated and/or propoxylated and/or butoxylated. The order of sequence of the ethylene oxide, the propylene oxide and the butylene oxide groups is not critical for the invention. Therefore, both the mixture of amidated fatty acids according to formula (I) comprising ethylene oxide and/or propylene oxide and/or butylene oxide in separate blocks and those amidated fatty acids according to formula (I) comprising ethylene oxide and/or propylene oxide and/or butylene oxide groups randomly distributed can be used in the compositions according to the invention.

In an embodiment of the present invention, P comprises, preferably consists of, n units of —$CH_2CH_2O$—, wherein n represents a number within the range of 0 to 20, preferably within the range of 1 to 15, more preferably within the range of 1 to 10, even more preferably from 1 to 5; m and q represent 0; and the sum of n+m+q represents the average alkoxylation degree which corresponds to a number from 1 to 40, preferably from 1 to 20, more preferably from 1 to 10, even more preferably from 1 to 5.

In another embodiment of the present invention, P comprises, preferably consists of, m units of —$(CH_2CHR^2O)$— or —$(CHR^2CH_2O)$—, wherein m represents a number within the range of 0 to 20, preferably within the range of 1 to 15, more preferably within the range of 1 to 10, even more preferably from 1 to 5; and n and q represent 0, and the sum of n+m+q represents the average alkoxylation degree which corresponds to a number from 1 to 40, preferably from 1 to 20, more preferably from 1 to 10, even more preferably from 1 to 5.

In another embodiment of the present invention, P comprises, preferably consists of, q units of —$(CH_2CHR^3O)$— or —$(CHR^3CH_2O)$—, wherein q represents a number within the range of 0 to 20, preferably within the range of 1 to 15, more preferably within the range of 1 to 10, even more preferably from 1 to 5; and n and m represent 0, and the sum of n+m+q represents the average alkoxylation degree which corresponds to a number from 1 to 40, preferably from 1 to 20, more preferably from 1 to 10, even more preferably from 1 to 5.

In another embodiment of the present invention, P comprises, preferably consists of, n units of —$(CH_2CH_2O)$—, and m units of —$(CH_2CHR^2O)$— or —$(CHR^2CH_2O)$, wherein n represents a number within the range of 0 to 20, preferably within the range of 1 to 15, more preferably within the range of 1 to 10, even more preferably from 1 to 5; m represents a number within the range of 1 to 40, preferably within the range of 1 to 20, more preferably within the range of 1 to 10, even more preferably from 1 to 5; q represents 0, and the sum of n+m+q represents the average alkoxylation degree which corresponds to a number from 1 to 40, preferably from 1 to 20, more preferably from 1 to 10, even more preferably from 1 to 5.

In another embodiment of the present invention, P comprises, preferably consists of, m units of —$(CH_2CHR^2O)$— or —$(CHR^2CH_2R^2)$—, and q units of —$(CH_2CHR^3O)$— or —$(CHR^3CH_2O)$—, wherein m represents a number within the range of 0 to 20, preferably within the range of 1 to 15, more preferably within the range of 1 to 10, even more preferably from 1 to 5; q represents a number within the range of 0 to 20, preferably within the range of 1 to 15, more preferably within the range of 1 to 10, even more preferably from a range of 1 to 5; n represents 0, and the sum of n+m+q represents the average alkoxylation degree which corresponds to a number from 0 to 40, preferably from 1 to 20, more preferably from 1 to 15, even more preferably from 1 to 5.

In another embodiment of the present invention, P comprises, preferably consists of, n units of —$(CH_2CH_2O)$—, and q units of —$(CH_2CHR^3O)$— or —$(CHR^3CH_2O)$—, wherein n represents a number within the range of 0 to 20, preferably within the range of 1 to 15, more preferably within the range of 1 to 10, even more preferably from 1 to 5; q represents a number within the range of 0 to 20, preferably within the range of 1 to 15, mire preferably from 1 to 10, even more preferably from 1 to 5; m represents 0, and the sum of n+m+q represents the average alkoxylation degree which corresponds to a number from 1 to 40, preferably from 1 to 20, more preferably from 1 to 10, even more preferably from 1 to 5.

In a particular preferred embodiment of the present invention, amidated fatty acids or derivatives thereof of formula (I) wherein P comprises or consists of n units of —($CH_2CH_2O$)— and m units of —($CH_2CHR^2O$)— or —($CHR^2CH_2O$)—, wherein n represents a number within the range from 1 to 5; and m and q represent 0, and the sum of n+m+q represents the average alkoxylation degree which corresponds to a number from 1 to 5.

In another preferred embodiment of the present invention, P comprises or consists of n units of —($CH_2CH_2O$)— and m units of —($CH_2CHR^2O$)— or —($CHR^2CH_2O$)—, wherein n represents a number within the range 1 to 5; m represents a number within the range from 1 to 5; and the sum of n+m+q represents the average alkoxylation degree which corresponds to a number from 1 to 5.

Preparation Process

According to the present invention, detailed process to obtain amidated fatty acids or derivatives thereof according to the formula (I), include the following steps:

Step (A) Reacting Compound of Formula (II) with Alkanolamine.

According to the invention, step (A) comprises the reaction of a glyceride compound with an alkanolamine, wherein the glyceride compound is represented by formula (II):

wherein $R^4$, $R^5$ and $R^6$ independently represent a linear or branched alkyl chain containing 4 to 26, preferably from 8 to 22, more preferably from 12 to 18 carbon atoms, or a linear alkenyl chain containing 4 to 26, preferably from 8 to 22, more preferably from 12 to 18 carbon atoms and from 1 to 3 double bonds.

In another embodiment of the present invention, $R^4$, $R^5$ and $R^6$ are independently a linear or branched alkyl or a linear alkenyl chain derived from natural fats and oils, as well as of synthetic origin. Preferred fats and oils include palm oil, coconut oil, sunflower oil, rapeseed oil, castor oil, olive oil, soybean oil; animal fat such as tallow, bone oil, fish oil, hardened oils and semihardened oils thereof, and mixtures thereof.

In a preferred embodiment of the invention, $R^4$, $R^5$ and $R^6$ are independently a linear or branched alkyl containing 4 to 26 carbon atoms, or a linear alkenyl containing 4 to 26 carbon atoms and from 1 to 3 double bonds; preferably, the alkyl or alkenyl contains 8 to 22 carbon atoms, more preferably 12 to 18 carbon atoms, derived from natural oils.

In another preferred embodiment of the present invention, fats and oils include palm oil, coconut oil, sunflower oil, rapeseed oil, castor oil, olive oil, soybean oil; animal fat such as tallow, bone oil, fish oil, hardened oils and semi-hardened oils thereof, and mixtures thereof.

In a particular preferred embodiment, $R^4$, $R^5$ and $R^6$ are independently a linear or branched alkyl chain containing 8 to 22 carbon atoms, or a linear alkenyl chain containing 8 to 22 carbon atoms and from 1 to 3 double bonds, derived from rapeseed oil.

In another embodiment of the present invention, the term "alkanolamine" represents an organic amine comprising a primary, secondary or tertiary amine function, and one or more linear or branched $C_1$-$C_8$ alkyl groups bearing one or more hydroxyl radicals.

Alkanolamines such as mono-, di- or tri-alkanolamines comprising from one to three identical or different $C_1$-$C_4$ hydroxyalkyl radicals are in particular suitable for performing the invention.

Compounds of this type include but are not limited to monoethanolamine, diethanolamine, triethanolamine, monoisopropanolamine, diisopropanolamine, N-dimethylaminoethanolamine, 2-amino-2-methyl-1-propanol, triisopropanolamine, 2-amino-2-methyl-1,3-propanediol, 3-amino-1,2-propanediol, 3-dimethylamino-1,2-propanediol and trishydroxymethylaminomethane.

In a preferred embodiment of the invention, alkanolamide are selected from primary alkanolamine such as monoethanolamine or monoisopropanolamine.

In another embodiment of the present invention, the molar ratio between compound of formula (II) and primary alkanolamine is selected from 1:1 to 4:1, preferably selected from 2.5:1 to 3.5:1.

According to the present invention step, reaction of compound of formula (II) with alkanolamine preferably occurs at range temperature from 100 to 180° C.

As a result from step (A) a mixture of glycerol and fatty acid amide is formed.

Step (B) Alkoxylation Step

After step A, alkoxylation of the mixture of glycerol with amidated fatty acid is performed.

In one embodiment of the present invention the mixture of glycerol and amidated fatty acids can be ethoxylated and/or propoxylated and/or butoxylated.

In another embodiment of the present invention, first ethylene oxide and/or butylene oxide are added, followed by the addition of propylene oxide.

In one embodiment, alkoxylation (ethoxylation and/or propoxylation and/or butoxylation) is carried out at a temperature of from 60° C. to 140°.

As a result from the present step a mixture of alkoxylated products as well as undesired by-products are formed.

The term "mixture of alkoxylated products" refers to a mixture of alkoxylated glycerol with alkoxylated fatty acid alkanolamide.

The term "undesired by-products" refers to the formation of acetaldehydes and dioxane among others.

Undesired by-products are mainly formed during ethoxylation of the fatty acid alkanolamine in Step (B). Using alkaline catalyst can reduce the dioxane formation to some extent. However, even in the presence of such catalyst, it was not possible to achieve desired concentrations according to present legislation in final product.

Surprisingly, the present inventors found that only the combined use of steam distillation and the addition of additives in two separate addition steps allows the production of fatty acid amides with particularly low undesired by-product concentrations (in particular: dioxane), and stable low color values even after longer storage (avoiding darkening of product).

In one embodiment of the present invention, dioxane concentration in the above mentioned mixture is from 20 to 1000 ppm, more preferably from 100 to 850 ppm.

According the present invention, previous step (A) and current step (B) are performed in a presence of catalysts. Catalysts are preferably selected from alkaline catalysts. Where, the presence of alkaline catalysts provide alkalinity to the reaction medium.

According to the present invention, reagents and alkaline catalysts are charged at the same time in the reactor before starting the process. Use of catalysts ensure obtaining a product with low concentrations of undesired by-products. Once reagents and catalysts are introduced into reactor, reactor is purged with nitrogen to remove essentially all traces of oxygen. Presence of oxygen can cause subsequent oxidation of undesired by-products leading to a darkening of the product.

Even though alkaline catalysts and reagents are introduced at the same time into reaction medium before the process starts and the reaction occurs, alkaline catalysts are used during alkoxylation step (step (B)).

Alkaline catalysts are used in quantities of typically 0.1% to 10% wt. based on total weight of components and preferably 0.1% to 5% wt. by weight of component, more preferably selected from 0.1 to 1% by weight of component.

In an embodiment of the present invention, alkaline catalysts are preferably selected from alcoholates, hydroxides, hydrides, carbonates groups or salts thereof; more preferably selected from carbonates groups; even more preferably selected from carbonate salts.

The alkaline catalysts salts are normally selected from alkali metal ions, where alkali metal ions are preferably selected from sodium, potassium or lithium ions; more preferably from sodium or potassium ions; even more preferably from potassium ions.

Examples of suitable alkaline catalysts includes but not limited to sodium ethoxide, potassium isopropoxide, Lithium hydroxide, Sodium hydroxide, Potassium hydroxide, Lithium hydrides, Sodium hydrides, potassium hydrides, sodium carbonate and potassium carbonate.

In a preferred embodiment of the present invention, alkaline catalysts are preferably selected from carbonate salts. Wherein, carbonate salts are preferably selected from sodium or potassium ions.

In another preferred embodiment, alkaline catalyst is present in a concentration amount from 0.1% wt. to 1% wt. based on total weight of component.

Step (B) in the process of the present invention does not necessarily require the presence of reducing agents to achieve the advantageous effects of the invention in terms of by-product levels and color. Accordingly, in a preferred embodiment of the invention, the amount of borohydrides, more particularly sodium borohydride, and/or hypophosphorous acid or alkali metal salts thereof, more preferably, the total amount of reducing agents present in the reaction mixture during Step (B), is below 0.1% by weight, more preferably below 0.05% by weight, based on the starting materials. In a further a preferred embodiment of the invention, the reaction mixture during Step (B) is free of borohydrides, more particularly sodium borohydride, and/or hypophosphorous acid or alkali metal salts thereof; and is more preferably free of reducing agents.

Step (C) Steam Distillation

According to the present invention, after step (B) there is a steam distillation. Steam distillation is a separation technique that takes advantage of the low boiling point property of immiscible mixtures. It is predominately used to separate temperature-sensitive organic molecules from a non-volatile contaminant. It is an useful technique to separate purify compounds.

According to the present step, temperature conditions are from 60° C. to 120° C. under alkaline conditions.

In one aspect of the present invention, present step is characterized by the reduction of traces of undesired by-products formed during the previous step (step (B)). The reduction of traces of undesired by-products allows to improve the quality of the product and product fulfillment of stablished concentrations in legislation.

The term "reduce undesired by-products concentration" refers to the substantially removal or reduction of dioxane and acetaldehydes into the reaction medium.

In an embodiment of the present invention traces of dioxane are reduced until achievement of concentration up to 10 ppm; more preferably of dioxane concentration up to 1 ppm or even more preferably dioxane concentration is lower than 1 ppm.

Present step (C), is carried out in several intervals of time but not limited to these intervals. Suitable intervals to carry out the present step are 5 to 90 min., preferably 5 to 30 min., more preferably from 30 to 60 min., even more preferably from 60 to 90 min.

In a preferred embodiment of the present invention, suitable interval of time to perform steam distillation is selected from preferably from 30 to 60 min., even more preferably from 60 to 90 min. Wherein, traces of dioxane amount are reduced until achieve a concentration of 1 ppm or lower than 1 ppm.

In a second aspect of the present step (C), it is characterized by the use of one or more additives or mixtures thereof, preferably mixtures of additives are used. According to the inventive process, additives or mixtures thereof are introduced into reaction medium to reduce or substantially avoid the discoloration or browning of mixture of fatty acid amides. As previously mentioned, undesired by-products like residual oxygen and acetaldehydes formed during previous step cause the discoloration or browning of the mixture.

Addition of additives is performed in two separate steps.

First addition of additives occurs before starting the present step (C), i.e., once step B is finished. At this point, undesired by-products may start to be present into reaction medium. Second addition of additives is then performed at the end of the process (i.e., before, during, or after step (C)). Preferably, the second addition is performed before or after step (C); more preferably, after step (C).

The addition of additives into the reaction medium, during first and second addition are made totally or in part.

In an embodiment of the present invention, suitable additives are selected from antioxidants, reducing agents, chelating agents, preservatives, or mixtures thereof; preferably selected from antioxidants, preservatives, or mixtures thereof; even more preferably from a mixture of antioxidants and preservatives.

Antioxidants are commonly used as radical or oxygen scavengers to avoid the presence of undesired by-products into reaction medium. According to the present invention, suitable antioxidants include but are not limited to phenol or toluol groups. Examples of suitable antioxidants are BHT, a-Tocopherol (Vitamin E), Dodecylgallat, Butylhydroxyanisol, Pentaerythrityl Tetra-Di-t-Butyl Hydroxyhydrocinnamate, Benzotriazolyl Dodecyl p-Cresol.

Preservative agents are used to neutralize amines, reducing the imines formation. Suitable preservatives include but not limited to carboxylic acids. Examples of suitable compounds include ethanol, iso-propanol, parabens, benzoic acid, citric acid, lactic acid and ascorbic acid.

Suitable reducing agents include but are not limited to Alkali metals, alkali earth metals, hydrogen, hydrides. Examples of suitable compounds include Lithium, Sodium, Potassium, Rubidium, Caesium, Francium, Beryllium, Magnesium, Calcium, Strontium, Barium, Radium, $LiAlH_4$, $NaBH_4$, NaH and $Na_2CO_3$.

Examples of chelating agents include but not limited to EDTA, gluconic acid, citric acid, tartaric acid, adipic acid, and ascorbic acid.

In a preferred embodiment of the present invention, preferred additives are selected from antioxidants, preservatives or mixtures thereof and from mixtures of antioxidants and preservatives.

In an embodiment of the present invention, during first addition of additives Additive A and Additive B may be added separately or as a mixture.

In another embodiment of the present invention, first addition of additives comprises the total addition of additive A.

In another embodiment of the present invention, first addition of additives comprises the total addition of additive B.

In another embodiment of the present invention, first addition of additives comprises the addition of a mixture of additive A and additive B. Wherein, additive A may be totally added into the mixture with part of additive B, and the remainder of additive B may be added at the later point of the process during second addition of additives.

In another embodiment of the present invention, first addition of additives comprises the addition of a mixture of additive A and additive B. Wherein, additive B may be totally added into the mixture with part of additive A, and the remainder of additive A may be added at the later point of the process during second addition of additives.

The additive A and additive B are each present in a "synergistic" mixture. By "synergistic" mixture is meant that each additive is present, relative to the other, in an amount such that the mixture of additives is more effective in reducing color than the equivalent weight of either component alone. Further additive A and additive B are used together in a "color stabilizing" amount. By "color stabilizing" is meant an amount of the mixture in relation to the reactants and products, which is sufficient to render the product less colored than if additive A and additive B are not present.

As used herein, the term "additive A" preferably refers to antioxidant(s), more preferably phenolic antioxidant(s).

As used herein, the term "additive B" preferably refers to preservative(s).

The combined use of antioxidant(s) and preservative(s) as additives is particularly preferred, and can provide enhanced synergistic effects in terms of color stabilizing, but also in terms of reducing the amount of undesired by-products. The color formation during storage can be caused by oxidation of terminal OH groups to aldehydes. Aldehydes together with free amines can form imines, which are responsible of the darkening of the product. Additives, such as phenolic antioxidants, can function as oxygen scavengers, and preservatives can neutralize or bonds part of the amines and reduces so the imines formation.

In one embodiment of the present invention, additive A is present in amount from 0.005% to 0.5% wt. based on the total weight of component, more preferably from 0.005% to 0.2% wt. based on the total weight of component, even more preferably from 0.005% to 0.1% wt. based on the total weight of component.

In another embodiment of the present invention, additive B is present in amount selected from 0.01% to 0.5% wt. based on total weight of component, more preferably from 0.01% to 0.2% wt based on total weight of component, even more preferably from 0.01% to 0.1% wt. based on total weight of component.

The color of the fatty acid amides produced by the process invention is low and, remains relatively low during storage. However, the obtained mixture can become darker with long term storage. The storage color stability can be further increased by a post-reaction treatment.

According to the present invention, the mentioned post reaction treatment for color stabilizing is performed after step C.

The term "post-reaction treatment for color stabilizing" refers to the addition of water followed by the second addition of additives which is produced subsequent to the reaction. The mentioned post reaction treatment will render the mixture of amidated fatty acid more stable in color as compared to if it were not added.

The addition of water can reduce formation of dioxane, e.g., during storage. The addition of water can also reduce the acetaldehyde and formaldehyde content. Furthermore, water facilitates the oxidation of aldehydes to carboxylic acids under alkaline conditions, which improves the color.

As a post treatment, before to start with the addition of water into the mixture, range temperature should be controlled from 80 to 60° C. to avoid product gelation or precipitation.

In one embodiment of the present invention, as a post treatment, water is preferably added in an amount from 6.5% to 8.5% wt. based on total weight of component.

In another embodiment of the present invention, to continue with the post reaction color stabilizing, second addition of additive is made. Second addition of additive B is preferably added in an amount from 0.05% to 1% w based on total weight component, more preferably from 0.05% to 0.5% wt. based on total weight of component, even more preferably from 0.05% wt. to 0.2% wt. based on total weight of component.

In the preferred embodiment of the present process the order of addition of various ingredients is as follow:
i) First addition of additives: before Step (C), mixture of additive A and part of additive B is added to the solution obtained in step (B).
ii) Performance of step (C): Steam distillation of the Mixture obtained during step (B)
iii) Post reaction treatment: addition of water to the mixture of step ii)
iv) Second addition of additives: the remainder of additive B is added to the solution, then process for obtaining amidated fatty acids or derivatives thereof is done.

In another preferred embodiment of the present invention, during first addition of additives, from about 0.005% wt. to 0.1% wt. based on total weight of component of Additive A and from 0.01% wt. to 0.1% wt. based on total weight of component Additive B is added.

In another preferred embodiment of the invention, the addition of water is made followed by the second addition of additives. Wherein, second addition of additives, includes the addition of remainder of additive B in an amount selected from 0.05% wt. to 0.2% wt. based on total weight of component.

By using the process described herein, amidated fatty acid(s) or derivative(s) thereof can be obtained. According to a preferred embodiment of the invention, amidated fatty acid(s) or derivative(s) thereof are provided which have dioxane concentration of 1 ppm or less; preferably less than 1 ppm; and/or stable low color values 15 weeks of storage at 30° C. under air; preferably stable color value (Gardner) <3.9, more preferably <2.6 immediately after production, and/or <5.6, more preferably <3.7 after 15 weeks of storage at 30° C. under air.

The Gardner Color Scale is a one-dimensional scale used to measure the shade of the color yellow, as specified in DIN ISO 4630.

Use of Amidated Fatty Acids or Derivatives Thereof According to the Invention

The composition comprising amidated fatty acids or derivative thereof of formula (I) obtained according to the process of the present invention can be used in cosmetic applications, such as bath products, shaving products, skin care products, make-up, skin cleansing products, shampoo, hair conditioners, and deodorant.

Another aspect of the present invention, present composition could be used in cosmetics as thickener for different kind of typical oils, e.g. natural triglycerides, silicone oils.

Another aspect of the present invention is the use of the alkoxylated fatty amide as emulsifier for different oils, like jojoba oil and other triglycerides.

The compositions according to the invention can be used in industrial applications, such as in engine oils, lubricants, metal working fluids or oil field applications.

The use of compositions comprising amidated fatty acids or derivative thereof in industrial applications can be explained due to its foam control ability, lime soap dispersion, high thermal stability, electrolyte stability, hydrotropic properties, solubilizing properties, good emulsifier, water hardness stability as well as improved lubricity and corrosion inhibition.

The compositions comprising amidated fatty acids or derivative thereof of formula (I) obtained according to the invention can be used as additives in formulations for industrial applications. That is, the compositions according to the invention can be used as additives in engine oil formulations, in lubricant formulations, in metal working fluids formulations or oil field formulations.

Another aspect of the present invention is the use of the composition according to the invention in oil field.

Another aspect of the present invention is a process of preparation of an engine oil, said process comprising adding to the engine oil a composition according to the present invention.

Another aspect of the present invention is a process of preparation of an oil field composition, said process comprising adding to the oil field composition a composition according to the invention.

The following examples are given in order to provide a person skilled in the art with a sufficiently clear and complete explanation of the present invention, but should not be considered as limiting of the essential aspects of its subject, as set out in the preceding portions of this description.

EXAMPLES

Examples section refers to the process to obtain amidated fatty acids or derivatives thereof.

Example 1

200 g rapeseed oil are filled into a pressure reactor. Stirring is started. At 40° C. 40.7 g monoethanolamine and 1.0 g potassium carbonate are added. The mixture is inertized 3× with vacuum and equalized with nitrogen. Then the mixture is heated up till 160° C. and the temperature is hold at 160° C. for 150 minutes. After that the batch is cooled till 105° C. The obtained amide is alkoxylated at 105° C. with 89.8 g ethylene oxide. After finished dosage the mixture is hold at 105° C. till the pressure is stable for 5 minutes. The mixture is set under vacuum (100 mbar) for 20 minutes. Then the pressure is equalized with nitrogen and the batch is cooled till 65° C. 0.27 g of an aqueous citric acid solution (25% in water) and 0.17 g phenolic antioxidant (i.e. BHT, a-Tocopherol (Vitamin E)) are added and dissolved under stirring. The batch is heated up till 97° C. Then vacuum is applied (100-150 mbar). After that 10 g steam of the obtained mixture are passed through the mixture and distilled for 60-80 minutes. The vacuum is equalized with nitrogen till atmospheric pressure. The batch is cooled till 85° C. 24.7 g water are added. After that the batch is cooled till 60° C. to add 0.52 g phenolic antioxidant. Then the batch is homogenized 15 minutes under stirring.

Example 2

200 g rapeseed oil are filled into a pressure reactor. Stirring is started. At 40° C. 40.7 g monoethanolamine and 1.0 g potassium carbonate are added. The mixture is inertized 3× with vacuum and equalized with nitrogen. Then the mixture is heated up till 160° C. and the temperature is hold at 160° C. for 150 minutes. After that the batch is cooled till 105° C. The obtained amide is alkoxylated at 105° C. with 89.8 g ethylene oxide. After finished dosage the mixture is hold at 105° C. till the pressure is stable for 5 minutes. The mixture is set under vacuum (100 mbar) for 20 minutes. Then the pressure is equalized with nitrogen and the batch is cooled till 85° C. 10 g water are added. The batch is homogenized for 5 minutes and after that cooled till 65° C. 0.27 g of an aqueous citric acid solution (25% in water) and 0.17 g phenolic antioxidant are added and dissolved under stirring.

Then 2.7 g water are added to the mixture. The batch is heated up till 97° C. Then vacuum is applied (100-150 mbar). After that 10 g steam are passed through the mixture and distilled for 60-80 minutes. The vacuum is equalized with nitrogen till atmospheric pressure. The batch is cooled till 85° C. 24.7 g water are added. After that the batch is cooled till 60° C. to add 0.52 g phenolic antioxidant. Then the batch is homogenized 15 minutes under stirring.

Comparative 1:

200 g rapeseed oil are filled into a pressure reactor. Stirring is started. At 40° C. 40.7 g monoethanolamine are added. The mixture is inertized 3× with vacuum and equalized with nitrogen. Then the mixture is heated up till 160° C. and the temperature is hold at 160° C. for 150 minutes. After that the batch is cooled till 105° C. The obtained amide is alkoxylated at 105° C. with 89.8 g ethylene oxide. After finished dosage the mixture is hold at 105° C. till the pressure is stable for 5 minutes. The mixture is set under vacuum (100 mbar) for 20 minutes. Then the pressure is equalized with nitrogen and the batch is cooled till 60° C.

Table 1 summarizes different embodiments according to the present invention and comparative example.

Table 2 summarizes undesired by-products concentration in processes according to the present invention and comparative processes. From these results, it can be seen that the undesired by-product concentration as dioxane and acetaldehyde concentration is reduced during steam distillation according to the present process with steam distillation. Synergistic effects result from the combination of steam distillation and in terms of removing of not only dioxane but also further minor impurities such as aldehydes, and other undesired products.

Table 3 summarizes dioxane concentration in processes during longer storage according to the present invention and comparative processes. From these results it can be seen that the dioxane concentration is reduced and remains constant during storage, according to the present process with use of catalyst and steam distillation.

Table 4 summarizes color Gardner values of amidated fatty acids during storage. From these results it can be seen that process according to the invention show better results in color Gardner values in the presence of additives and water as compared to when this is not the case. Particularly improved color values can be achieved by the use of additives, together with steam distillation, and the addition of water.

TABLE 1

Summary of different examples according to the present invention, and comparative example

| Examples | Catalyst | steam distillation | Addition of water | First addition of Additives | Second addition of Additives |
|---|---|---|---|---|---|
| Example 1 | K2CO3 | Yes | — | phenolic antioxidant Citric acid | Phenolic antioxidant |
| Example 2 | K2CO3 | Yes | Yes | phenolic antioxidant Citric acid | phenolic antioxidant |
| Comparative 1 | No | No | No | No | No |

TABLE 2

Summary of undesired by-products concentrations

| Example | Catalyst | steam distillation | Addition of water | First addition of Additives | Second addition of Additives | First addition of additives (% wt.) | Second addition of Additives (% wt.) |
|---|---|---|---|---|---|---|---|
| Example 1 | K2CO3 | Yes | — | phenolic antioxidant Citric acid | Phenolic antioxidant | 0.05 0.02 | 0.15 — |
| Example 2 | K2CO3 | Yes | Yes | phenolic antioxidant Citric acid | phenolic antioxidant | 0.05 0.02 | 0.15 |
| Comparative 1 | No | No | No | No | No | — | — |

| Example | Before Steam distillation (t = 0 min) | Steam distillation t = 5 min | Steam distillation t = 25 min | Steam distillation t = 30 min | Steam distillation t = 60 min | Steam distillation t = 90 min | Acetaldehyde [ppm] Directly after process to obtention |
|---|---|---|---|---|---|---|---|
| Example 1 | 599 | 419 | 95 | 23 | <1 | <1 | — |
| Example 2 | 599 | 419 | 95 | 23 | <1 | <1 | — |
| Comparative 1 | 3713 | — | — | — | — | — | 57 |

Dioxane [ppm]

TABLE 3

Summary of dioxane concentrations after longer storage

| Example | Catalyst | steam distillation | Addition of water | First addition of additives | second addition of additives | First addition of additives (% wt.) | Second addition of additives (% wt.) |
|---|---|---|---|---|---|---|---|
| Example 1 | K2CO3 | Yes | — | phenolic antioxidant Citric acid | Phenolic antioxidant | 0.05 0.02 | 0.15 — |
| Example 2 | K2CO3 | Yes | Yes | phenolic antioxidant Citric acid | phenolic antioxidant | 0.05 0.02 | 0.15 |
| Comparative 1 | No | No | No | No | No | — | — |

Dioxan [ppm]; Storage at 30° C. under air

| Example | Start | 1 weeks | 3 weeks | 5 weeks | 7 weeks | 9 weeks | 15 weeks |
|---|---|---|---|---|---|---|---|
| Example 1 | <1 | <1 | <1 | <1 | <1 | <1 | <1 |
| Example 2 | <1 | <1 | <1 | <1 | <1 | <1 | <1 |
| Comparative 1 | — | — | — | — | — | — | — |

TABLE 4

Summary of color Gardner values of amidated fatty acids during storage

| | | | | Process conditions | | | |
|---|---|---|---|---|---|---|---|
| Example | Catalyst | steam distillation | Addition of water | Additives during process | Additives after process | Additives during process (% wt.) | Additives after process (% wt.) |
| Example 1 | K2CO3 | Yes | — | phenolic antioxidant Citric acid | Phenolic antioxidant | 0.05 0.02 | 0.15 — |
| Example 2 | K2CO3 | Yes | Yes | phenolic antioxidant Citric acid | phenolic antioxidant | 0.05 0.02 | 0.15 — |
| Comparative 1 | No | No | No | No | No | — | — |

| | Color [Gardner]; Storage at 30° C. under air | | | | | | |
|---|---|---|---|---|---|---|---|
| Example | Start | 1 weeks | 3 weeks | 5 weeks | 7 weeks | 9 weeks | 15 weeks |
| Example 1 | 2.6 | 2.9 | 3.2 | 3.3 | 3.4 | 3.6 | 3.7 |
| Example 2 | 2.3 | 2.4 | 2.8 | 2.8 | 2.9 | 3.0 | 3.0 |
| Comparative 1 | 6.9 | — | — | — | — | — | — |

The invention claimed is:

1. A process for preparing amidated fatty acids or derivatives thereof represented by the general formula (I):

$$R^1\text{—C(O)—NH—(P)—H} \quad (I)$$

wherein $R^1$ is a linear or branched alkyl chain containing 4 to 26 carbon atoms, or a linear alkenyl chain containing 4 to 26 carbon atoms and from 1 to 3 double bonds; P comprises an average of n units of —(CH$_2$CH$_2$O)—, and/or an average of m units of —(CH$_2$CHR$^2$O)— or —(CHR$^2$CH$_2$O)—, and/or an average of q units of —(CH$_2$CHR$^3$O)— or —(CHR$^3$CH$_2$O)—, wherein $R^2$ represents a —CH$_3$ group, $R^3$ represents a —CH$_2$CH$_3$ group, n represents a number within the range of 0 to 20, m represents a number within the range of 0 to 20, q represents a number within the range of 0 to 20, and the sum of n+m+q represents the average alkoxylation degree which corresponds to a number from 1 to 40;

and wherein the process comprises the steps of:
(A) reacting a compound of formula (II) with an alkanolamine,

(II)

wherein $R^4$, $R^5$ and $R^6$ of formula (II) independently represent a linear or branched alkyl chain containing 4 to 26 carbon atoms, or a linear alkenyl chain containing 4 to 26 carbon atoms and from 1 to 3 double bonds;
(B) alkoxylation of the mixture obtained in the previous step; and
(C) steam distillation of the mixture obtained in the previous step,
wherein steps (A) and (B) are performed in the presence of a catalyst; and
wherein the process further comprises the addition of additive(s) selected from the group consisting of antioxidants, reducing agents, chelating agents, preservatives, and mixtures thereof, into the reaction medium performed in two separate addition steps:
first addition of one or more additives, once finished step (B) and before step (C); and
second addition of one or more additives before, during, or after step (C),
wherein the first addition step comprises adding a mixture comprising the antioxidant(s) and preservative(s).

2. The process according to claim 1, wherein in formula (I), n represents a number within the range of 0-15; q and m represent 0; and the sum of n+m+q represents the average alkoxylation degree which corresponds to a number from 0 to 15.

3. The process according to claim 1, wherein $R^1$ is a linear of branched alkyl chain containing 12 to 18 carbon atoms, or a linear alkenyl chain containing 12 to 18 carbon atoms and from 1 to 3 double bonds, and wherein $R^4$, $R^5$ and $R^6$ of formula (II) independently represent a linear or branched alkyl chain containing 12 to 18 carbon atoms, or a linear alkenyl chain containing 12 to 18 carbon atoms and from 1 to 3 double bonds.

4. The process according to claim 1, wherein step (C) of steam distillation is carried out in a time from 5 to 90 min.

5. The process according to claim 1, wherein step (C) of steam distillation is carried out in a time from 60 to 90 min.

6. The process according to claim 1, wherein the catalyst amount is from 0.1 to 10% wt. based on the total amount of composition.

7. The process according to claim 1, wherein the catalysts are alkaline catalysts.

8. The process according to claim 1, wherein the alkaline catalysts are carbonates, hydroxides, alcoholates, hydrides groups, of salts thereof.

9. The process according to claim 1, wherein one or more additives are selected from the group consisting of antioxidants, preservatives, and mixtures thereof.

10. The process according to claim 9, wherein:
the antioxidant is in an amount from 0.005% to 0.5% wt. and the preservative is in an amount from 0.1% to 0.5% wt, the % wt. being based on the total weight of component; or, alternatively,
the antioxidant is in an amount from 0.005% to 0.1% wt. and the preservative is in an amount from 0.01% to 0.1% wt, the % wt. being based on the total weight of component.

11. The process according to claim 1, wherein the second addition step comprises adding an amount of the same antioxidant as the one forming part of the mixture added in the first addition step.

12. The process of claim 11, wherein the antioxidant is added in an amount from 0.005% to 18 wt. based on the total weight of component.

13. The process according to claim 9, wherein the antioxidants are toluol and/or phenol derivatives.

14. The process according to claim 9, wherein the preservatives are carboxylic acids.

15. The process according to claim 14, wherein the carboxylic acids are citric acid, ascorbic acid, and/or lactic acid.

16. The process according to claim 1, wherein the process further comprises the addition of water after step (C), wherein the amount of water is within the range of 18 to 20% wt, based on the total amount of composition.

17. The process according to claim 16, wherein the amount of water is within the range of 6.58 to 8.5% wt. based on the total amount of composition.

18. The process according to claim 1, wherein the second addition of one or more additives is made after the addition of water.

19. The process according to claim 1, which comprises the following order of addition of ingredients:
   i) first addition step comprising adding a mixture of an antioxidant and a preservative to the mixture resulting from step (B), prior to step (C);
   ii) steam distillation of the resulting mixture;
   iii) addition of water; and
   iv) second addition step comprising adding to the resulting mixture an amount of the same preservative as the one forming part of the mixture of additives used in the first addition step.

20. The process according to claim 19, wherein the second addition step is performed by adding the same preservative as the one forming part of the mixture of additives used in the first addition step, the preservative been added in an amount of from 0.05% to 0.2% wt. based on the total weight of component.

* * * * *